June 14, 1960 J. FISCHER ET AL 2,941,130
POLARIZED RELAY
Filed Sept. 10, 1957 5 Sheets-Sheet 3
Fig.3
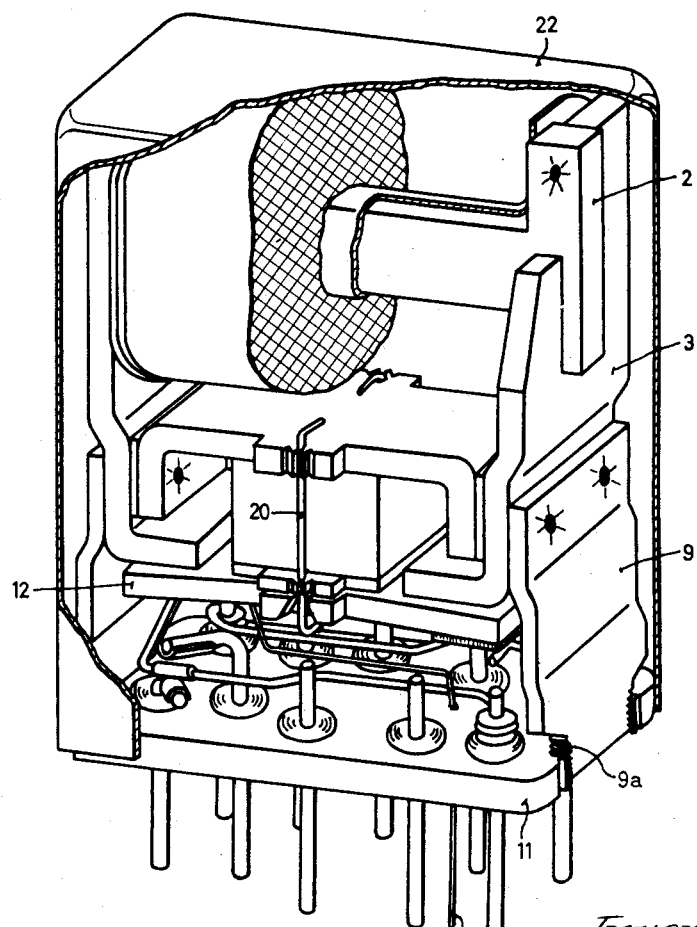
Inventors,
Josef Fischer,
Martin Aidn,
Christian Lind,
Alois Ruhland,
Herbert Krautwald, &
Hans Helmrich.
By  Atty.

June 14, 1960  J. FISCHER ET AL  2,941,130
POLARIZED RELAY
Filed Sept. 10, 1957  5 Sheets-Sheet 4

Inventors.
Josef Fischer,
Martin Aidn,
Christian Lind,
Alois Ruhland,
Herbert Krautwald, &
Hans Helmrich.

June 14, 1960   J. FISCHER ET AL   2,941,130
POLARIZED RELAY

Filed Sept. 10, 1957   5 Sheets-Sheet 5

Inventors.
Josef Fischer,
Martin Ajdn,
Christian Lind,
Alois Ruhland,
Herbert Krautwald, &
Hans Helmrich.

By

Atty.

United States Patent Office 2,941,130
Patented June 14, 1960

2,941,130

POLARIZED RELAY

Josef Fischer, Martin Aidn, Christian Lind, Alois Ruhland, and Herbert Krautwald, Munich, and Hans Helmrich, Munich-Geisenbrunn, Germany, assignors to Siemens & Halske Aktiengesellschaft Berlin and Munich, a corporation of Germany Filed Sept. 10, 1957, Ser. No. 691,116

Claims priority, application Germany Sept. 14, 1956

8 Claims. (Cl. 317—171)

This invention relates to polarized relays. The object of the invention is to provide a highly sensitive, quick acting and relatively shock proof polarized relay of small bulk and weight as compared with known polarized relays.

In the case of many electrical switching problems, for example, in the case of optical-electrical transmitters, only weak control or actuating energy is often-times available, which by itself is not sufficient for the operation of normal relays. The necessary energy might be obtained in some instances, but the drain on the corresponding current source might occasion impermissible errors. There are other reasons demanding in many situations the use of weak control currents; for example, in devices using very delicate contacts and in self-protecting switching apparatus. It is, of course, possible to amplify as desired, by means of electronic tubes, even the weakest currents, but the use of amplifiers increases the costs and is discouraged for economic reasons.

The sensitivity of the relay is basically determined by the required energization energy. The lowest energy requirements for the actuation of a relay are given in the presence of least mechanical losses and least impedance for the magnetic flux. The relay armature is often premagnetized in order to increase the sensitivity. The premagnetization produced by a permanent magnet results in a permanent flux which branches normally in such a manner, that energizing or actuating flux and permanent flux are in opposition in the air gap between the armature and the flux-carrying parts while operating additively in the other air gap. The magnetic field produced by the actuating current, in conjunction with the field of the permanent magnet, affects the relay armature in such a manner, that the magnetic flux causes at one magnet pole a weakening while at the same time effecting strengthening of the other pole, thereby producing greater attraction and pulling the armature toward such pole. Polarized relays have a particularly high energization sensitivity, due to the fact, that the energization flux is superimposed upon the strong field of a permanent magnet. However, in addition to the low energy requirements, high requirements are put on such relays so far as the switching speed and insensitivity to shocks are concerned.

The galvanometer or rotary coil relay constitutes the most sensitive relay which is, however, relatively vulnerable to shocks due to its instrument-like structure and which does not permit high switching speed. Accordingly, polarized so called telegraph relays are in many cases used, such relays being widely employed in telegraphy. Relays of this kind have a sensitivity required for most cases of operation, but their construction demands a great expenditure and most delicate mechanical precision, thus making such relays relatively expensive. These relays are, in addition, relatively heavy and bulky and for these reasons in many cases inapplicable.

As initially indicated, the object of the present invention is to provide a relatively highly sensitive polarized relay of far less weight and bulk than the polarized relays known heretofore. The corresponding decrease of the movable masses provides for very high switching speed and insensitivity to shocks. The new relay is also characterized by simple construction and requires less space than known relays.

The invention makes use of a known principle applied in relays, according to which the permanent flux is carried subdivided in two different directions over the pole pieces carrying the actuating flux circuit and from there over the working air gap of the armature such, that it extends in one working air gap in the same direction as the actuating flux while extending in the other air gap superimposed in opposite direction. However, the invention provides the particular feature according to which the coupling of the flux circuits is effected at the ends of the poles of the actuating flux circuit in the vicinity of the working air gaps, and also provides an armature comprising two wings, which is journalled, preferably centrally thereof, in front of a fixedly disposed permanent magnet or an intermediate member made of magnetic or non-magnetic material. The armature is suitably journalled in a rolling pivot manner rockably directly upon the fixedly disposed permanent magnet or upon an intermediate member secured thereto.

As recognized in the art, the journalling of a relay armature is of decisive importance for the sensitivity of the relays. The journals dissipate, due to relatively great frictional losses, a considerable part of the available control or actuating energy which is thus lost for the switching operation. As compared with this situation, the rockable pivot journal of the armature according to the invention, is practically without friction.

However, this type of journalling of the armature results in a further advantage so far as a favorable flux course is concerned. In a number of known relay structures, the actuating flux is carried over the armature journal or pivot, adversely affecting the sensitivity due to the unavoidable air gap losses. This also applies, for example, to the known armature knife-edge journal or pivot. In the case of the rockable pivot armature journal according to the invention, the permanent flux will find only a low transition impedance because of the relatively large flux-conducting cross-sections which are cooperatively involved. In view of the favorable flux flow, smaller permanent magnets may be used than in the case of other journal structures, thus benefiting the object of reducing bulk and weight. In order to secure the freedom of motion of the rockable pivot armature—which may be held by the permanent magnet without auxiliary mechanical means—in the operating direction, it is formed arcuate or provided with a bulge extending transverse of its longitudinal extent for rocking engagement with a plane surface of the permanent magnet.

In order to provide for the armature a defined normal position and for symmetry adjustment, there may be provided an adjustable spring, for example, in the form of a torsion wire fastened to the armature centrally thereof. The torsion wire is suitably carried through the bottom of the relay socket and fixed in position after adjustment of the armature in its normal position. In order to facilitate adjustment, the torsion wire may be in the form of a bell crank.

In accordance with another feature of the invention, the permanent magnet disposed for cooperation with the armature may be subdivided into two separate partial magnets with similarly acting poles. It is in this simple manner possible to equalize non-symmetries by different magnetization of the partial magnets. The corresponding arrangement also facilitates simple adjustment of the relay operation.

The foregoing and other objects and features of the invention will be brought out in the course of the description of embodiments which will be rendered below with reference to the accompanying drawings.

Figs. 2 and 3 show two embodiments of polarized relays exhibiting differences only in the disposition of the flux-carrying parts and the contacts;

Figure 1:
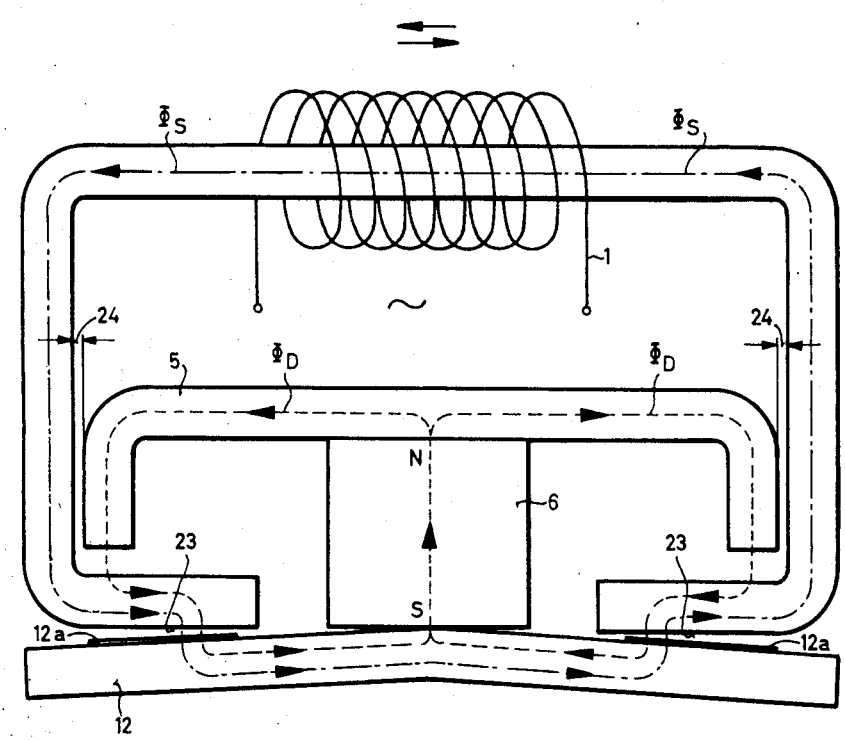
Fig. 1 shows in schematic manner a polarized magnet system, also indicating the flux flow, illustrating the principles involved.

In Fig. 1, the course of the permanent flux $\Phi_D$ is shown in dash lines and the course of the control or actuating flux $\Phi_S$ in dot-dash lines. The permanent flux $\Phi_D$ is produced by the permanent magnet 6 and the actuating flux $\Phi_S$ by the energizing or actuating coil 1. The fluxes are separated by the air gaps 24 and appear superimposed in the pole pieces 23 and in the armature 12. The equalizing flux of the permanent magnet over the core cross-section is in the median position of the armature 12 equal to zero and with the armature in actuated position relatively small. The core cross-section at the actuating coil 1 can for this reason be kept small in favor of the coil volume. It is possible to bring the iron cross-section of the flux path 5 nearly to saturation, by the permanent flux $\Phi_D$ so that only a small part of the actuating flux can flow along this path. In the parts of the magnetic circuit in which the permanent flux and the actuating flux are superimposed, that is, in the pole pieces 23 and in the armature 12, the fluxes will be added or one will be subtracted from the other, depending upon the direction of the actuating flux. The resulting flux will determine the mechanical motion of the armature which is provided with the residual members 12a. The advantage of this magnetic circuit resides in its simplicity and compact structure. The armature is provided with a bulge or formed slightly arcuate longitudinally thereof, thus providing for the rocking pivot or journal; the journalling in the center of gravity making the armature relatively insensitive to accurate positioning. Holding means for the armature are not absolutely necessary, the force of attraction of the permanent magnet being sufficient to hold it even in the presence of considerable shocks. However, it will be advisable to provide means for securing the armature in assigned position against creeping.

Figure 2:
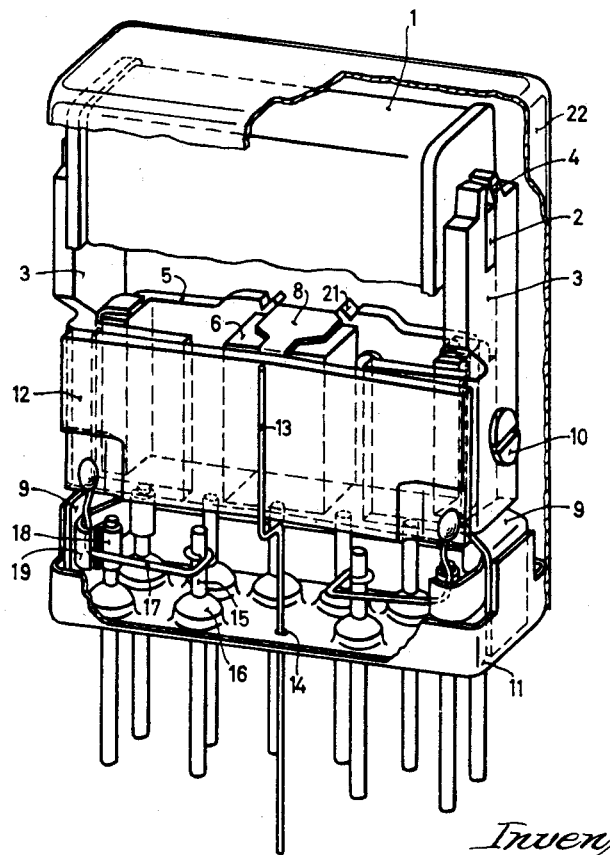

In Fig. 2 is shown an embodiment in which the rocking pivot armature with its permanent flux circuit is shown displaced by 90° as compared with the position in which it is shown in Fig. 1, without, however, changing the principle of operation and the data required for the realization thereof.

Referring now to Fig. 2, numeral 1 again indicates the control or actuating coil. The ends 2 of the core of the coil are disposed in suitable slots formed in two yoke or heel pieces 3 and secured in position, for example, by bending-over the extensions 4. The core may, of course, be secured to the heel pieces in different manner, for example, by welding, riveting or the like. Underneath the actuating coil, between the heel pieces 3, there is disposed the angular flux member or bracket 5 which carries the permanent magnet 6, the member 5 being provided with suitable nipples punched thereinto for fixing the permanent magnet in proper position. A spring 8 carried by the flux member or bracket 5 secures the permanent magnet in its position. Between the heel pieces 3 and the flux member 5 there is provided, on each side, a carrier 9 of non-magnetic material, for separating the permanent magnet circuit from the actuating circuit. Screws 10 or the like hold the heel piece on each side together with the flux bracket 5 and the carrier 9. These parts may be interconnected by other means, for example, by welding. The carriers 9 also serve for fastening the entire relay system on the base 11. The armature 12 which is, as in Fig. 1, formed as a rocking pivot armature, can execute a rocking motion with respect to the permanent magnet 6.

For the setting of the normal position of the armature, there is provided a torsion wire 13 which is carried thereby and extends to the outside through a hole 14 in the base 11. Relays of such small size, having necessarily relatively sensitive contacts are normally tightly sealed, for example, by soldering, in order to exclude exterior influences. The torsion wire 13, being carried through the bottom of the base, makes it possible to correct the position of the armature or to set it into a desired normal position, even after the sealing of the relay parts. Such setting or adjustment is effected by rotation of the torsion wire about its longitudinal axis which may approximately coincide with the line of the rocking pivot of the armature. After the armature is thus set or adjusted and symmetry obtained, the outwardly projecting part of the torsion wire 13 is fastened to the bottom of the base and the hole 14 through which the wire 13 extends is suitably sealed.

Contact pins 15 are secured to the base 11 by means of fused glass seals 16. The contact pins are arranged so as to exclude wrong plugging-in of a relay into a socket provided therefor. The relay base is provided for two switch-over contacts and four coil connections. Numeral 17 indicates interconnecting wires made of resilient contact material, or other suitable spring material which is at the contact areas provided with contact material. These wires are connected with the respectively associated contact pins 15, for example, by soldering. The outer contacts of the switch-over contact are rigidly disposed and comprise annular members 18 fastened to corresponding contact pins 15 by welding or soldering, for contact-making cooperation with the wires 17, the latter being disposed for cooperation with contact 19. The interconnecting wires 17 are tensioned with respect to the armature and press against it with approximately equal force when the armature is in its normal position.

The entire system is enclosed within a protective cover 22 which is for magnetic shielding preferably made of iron and suitably connected with the base, for example, by welding or soldering.

The embodiment according to Fig. 3 corresponds in the arrangement of parts to Fig. 1. As compared with Fig. 2, the connection of the coil core 2 with the yokes or heel pieces 3 exhibits large overlapping surfaces and is effected by welding so as to obtain good flux passage. The carriers 9 are welded to the flux-carrying parts and their lower ends are serrated as indicated at 9a for securing them and therewith the magnet system in position on the base 11 at a level at which the magnet system is in proper position with respect to the contacts. Indentations may be punched into the connecting parts to fix them in connected position. The corresponding portions may be sealed with solder upon soldering the cap or cover 22 in its sealed position. For the subsequent adjustment of symmetry or the normal armature position, there is provided a wire such as 13 in Fig. 2, which is carried to the outside through a suitable hole in the base. A wire bracket 20 serves for holding the armature 12 in assigned position against creeping.

Figure 4:
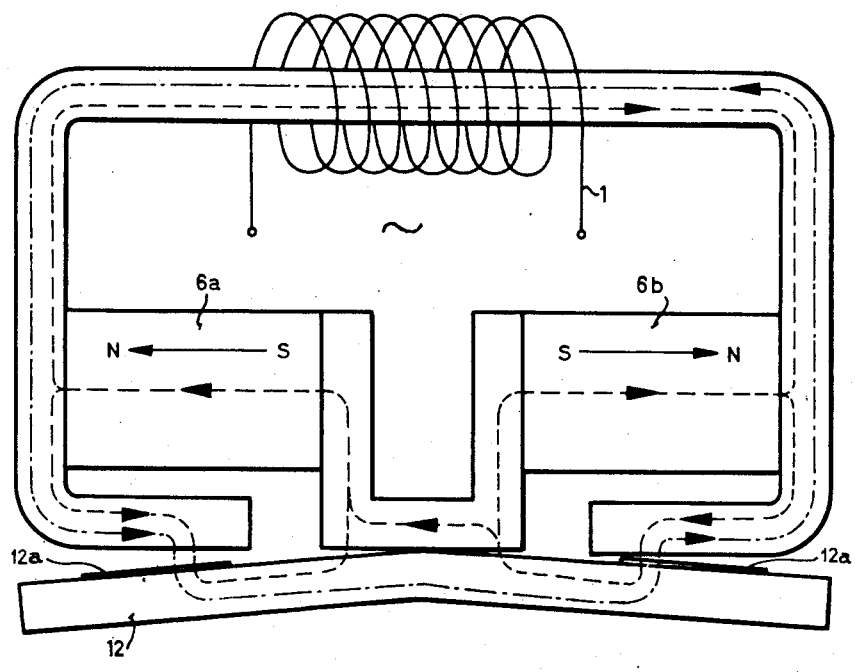
Fig. 4 illustrates a variant of the magnet system shown in Fig. 1.

Fig. 4 shows an arrangement of parts in which only the permanent flux circuit is modified as compared with the arrangement of parts according to Fig. 1. The actuating flux is again generated by the coil 1. Instead of one permanent magnet, there are provided two partial magnets 6a and 6b. Accordingly, each of the two working air gaps will be inductively affected preponderently by the respectively adjacent partial magnet. The corresponding induction may be determined after completion of the relay, making it possible to omit a torsion or like spring for the adjustment of the symmetry or the attraction characteristic as in the previously described embodiments.

The means for securing the armature journal or pivot may receive different form; some of the possibilities are illustrated in Figs. 5 to 10.

Figure 5:
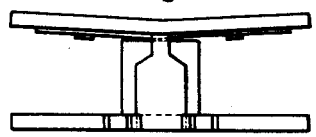
Figs. 5 to 10a show different embodiments of armature journals or pivots.
Figure 5A:
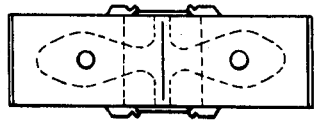

Figs. 5 and 5a show the use of leaf springs with torsion bars made of magnetic or non-magnetic material.

Figure 6:
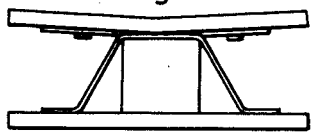
Figure 6A:
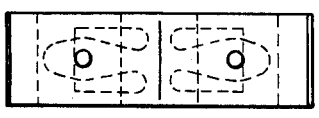

Figs. 6 and 6a illustrate a similar journalling employing torsion bars and angular interconnecting parts.

Figure 7:
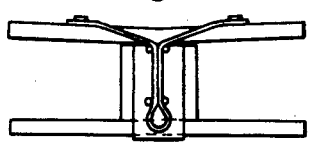
Figure 7A:
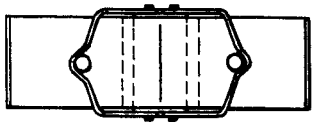
Figure 8:
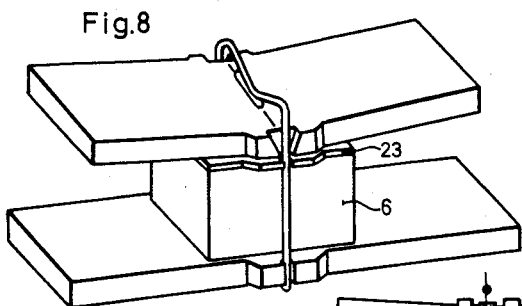

Figs. 7, 7a and 8 show the use of wire members. A wire bracket or stirrup is positioned by means of a soft iron pole plate 23 which is welded to the permanent magnet 6. The pole plate 23 effects collection and more uniform distribution of the permanent flux branches relative to the central position of the armature.

Figure 9:
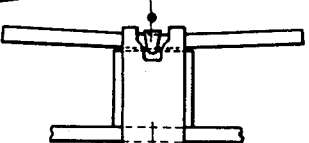
Figure 9A:
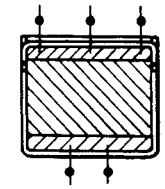

Figs. 9 and 9a show an example for journalling the armature employing curved sheet members.

Figure 10:
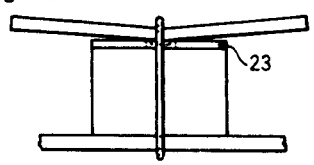
Figure 10A:
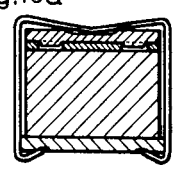

In Figs. 10 and 10a, the journalling makes use of nipples which engage corresponding recesses in the pole plate 23.

In the embodiments according to Figs. 5, 6, 8 and 10, the rocking motion of the armature is indirect with respect to the permanent magnet; in the embodiments according to Figs. 7 and 9, the armature engages the permanent magnet directly.

The spring means used for securing the journalling or pivoting of the armature may also take over a part of the compensation.

Torsion leaf springs used for securing the armature pivoting may also take over the function of residual members such as 12a in Figs. 1 and 4. The yoke or heel piece or the armature may be copper-plated along the corresponding pole surfaces and residual members such as 12a may in such cases be omitted.

Changes may be made within the scope and spirit of the appended claims.

We claim:

1. A polarized relay comprising permanent magnet means, flux conducting means connected with said permanent magnet means symmetrical thereto, permanent flux flowing in said flux conducting means nearly in the saturation range thereof, an armature disposed centrally thereof in pivotal rocking relationship relative to said permanent magnet means and thereby forming two wings extending outwardly from the center thereof, actuating flux means spaced from said permanent flux conducting means and forming pole pieces respectively disposed for cooperation with the opposite ends of said armature and forming corresponding air gaps therewith, means for producing an actuating flux in said actuating flux means and hence in the pole pieces formed thereby, said permanent flux extending subdivided in opposite directions over said pole pieces and thence over one air gap into said armature in a direction corresponding to the direction of the actuating flux and over said other air gap into said armature in a direction opposite to the direction of the actuating flux, whereby the coupling of said fluxes is effected at said pole pieces adjacent said air gaps to hold said armature in a corresponding actuated position.

2. A polarized relay according to claim 1, wherein said permanent flux conducting means and said actuating flux means are separated by air gaps formed therebetween.

3. A polarized relay according to claim 1 comprising leaf spring means for holding said armature in assigned position thereof relative to said permanent magnet means.

4. A polarized relay according to claim 1, comprising wire stirrup means for holding said armature in assigned position thereof relative to said permanent magnet means.

5. A polarized relay according to claim 1, wherein said permanent magnet means comprises two permanent magnets interconnected by an intermediate member constituting said permanent flux conducting means, said armature being disposed in pivotal rocking relationship relative to said intermediate member.

6. A polarized relay according to claim 5, wherein said permanent magnets exhibit tuned induction characteristics for the purpose of equalizing non-symmetries and for adjusting the operating values of said relay.

7. A polarized relay comprising permanent magnet means, flux conducting means connected with said permagnet means symmetrical thereto, permanent flux flowing in said flux conducting means nearly in the saturation range thereof, an armature disposed centrally thereof in pivotal rocking relationship relative to said permanent magnet means and thereby forming two wings extending outwardly from the center thereof, actuating flux means spaced from said permanent flux conducting means and forming pole pieces respectively disposed for cooperation with the opposite ends of said armature and forming corresponding air gaps therewith, means for producing an actuating flux in said actuating flux means and hence in the pole pieces formed thereby, said permanent flux extending subdivided in opposite directions over said pole pieces and thence over one air gap into said armature in a direction corresponding to the direction of the actuating flux and over said other air gap into said armature in a direction opposite to the direction of the actuating flux, whereby the coupling of said fluxes is effected at said pole pieces adjacent said air gaps to hold said armature in a corresponding actuated position, and casing means for enclosing said relay, setting means carried by said armature and extending outside of said casing means for setting said armature in desired normal position thereof, and means for sealing said setting means in adjusted position of said armature.

8. A polarized relay according to claim 7, comprising setting means in the form of a wire in bell crank shape.

References Cited in the file of this patent

UNITED STATES PATENTS

| | | |
|---|---|---|
| 2,458,939 | Hall | Jan. 11, 1949 |
| 2,481,003 | Curtis | Sept. 6, 1949 |
| 2,483,658 | Miller | Oct. 4, 1949 |
| 2,716,232 | Power | Aug. 23, 1955 |

FOREIGN PATENTS

| | | |
|---|---|---|
| S40780 | Germany | June 21, 1956 |